United States Patent
Koshikawa et al.

(10) Patent No.: US 8,110,065 B2
(45) Date of Patent: Feb. 7, 2012

(54) HEAT-CURABLE FLUOROPOLYETHER ADHESIVE COMPOSITION AND BONDING METHOD

(75) Inventors: Hidenori Koshikawa, Annaka (JP); Mikio Shiono, Annaka (JP); Hiroyasu Hara, Annaka (JP); Takashi Aketa, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 685 days.

(21) Appl. No.: 12/124,556

(22) Filed: May 21, 2008

(65) Prior Publication Data

US 2008/0289760 A1 Nov. 27, 2008

(30) Foreign Application Priority Data

May 25, 2007 (JP) .................. 2007-139131

(51) Int. Cl.
- C04B 37/00 (2006.01)
- C09J 7/02 (2006.01)
- C08F 283/00 (2006.01)
- C08F 283/12 (2006.01)
- C08G 77/00 (2006.01)
- C08G 77/38 (2006.01)
- C08L 83/00 (2006.01)

(52) U.S. Cl. .................. 156/325; 156/329; 525/478
(58) Field of Classification Search .................. 156/325, 156/329; 525/478

See application file for complete search history.

(56) References Cited

U.S. PATENT DOCUMENTS

| 5,312,855 | A | 5/1994 | Okami |
| 5,656,711 | A | 8/1997 | Fukuda et al. |
| 5,665,846 | A | 9/1997 | Sato et al. |
| 2004/0266925 | A1 | 12/2004 | Shiono |
| 2005/0032989 | A1 | 2/2005 | Onai et al. |
| 2005/0202260 | A1* | 9/2005 | Shiono .................. 428/448 |
| 2007/0100043 | A1 | 5/2007 | Shiono |

FOREIGN PATENT DOCUMENTS

| EP | 0 765 916 A2 | 4/1997 |
| EP | 1 172 414 A2 | 1/2002 |
| EP | 1 486 534 A1 | 12/2004 |
| JP | 2990646 | 10/1999 |
| JP | 3239717 | 10/2001 |
| JP | 2005-2142 | 1/2005 |
| JP | 2005-53966 | 3/2005 |
| JP | 2007-126496 | 5/2007 |

* cited by examiner

Primary Examiner — Philip Tucker
Assistant Examiner — Michael Orlando
(74) Attorney, Agent, or Firm — Oblon, Spivak, McClelland, Maier & Neustadt, L.L.P.

(57) ABSTRACT

A heat-curable fluoropolyether adhesive composition comprising (A) a linear polyfluoro compound having at least two alkenyl groups and a perfluoropolyether structure, (B) a fluorinated organohydrogensiloxane having at least two SiH groups, (C) a platinum group metal catalyst, (D) an organosiloxane having at least one SiH group and at least one epoxy and/or trialkoxysilyl group, and (E) a compound having at least two allyloxycarbonyl groups can be cured to metal and plastic substrates by heating at a temperature from 20° C. to less than 100° C.

6 Claims, No Drawings

HEAT-CURABLE FLUOROPOLYETHER ADHESIVE COMPOSITION AND BONDING METHOD

CROSS-REFERENCE TO RELATED APPLICATION

This non-provisional application claims priority under 35 U.S.C. §119(a) on Patent Application No. 2007-139131 filed in Japan on May 25, 2007, the entire contents of which are hereby incorporated by reference.

TECHNICAL FIELD

This invention relates to heat-curable fluoropolyether adhesive compositions which are fully adherent to metal and plastic substrates, and more particularly, to heat-curable fluoropolyether adhesive compositions which are cured by heat treatment below 100° C. and are fully adherent to aluminum, polybutylene terephthalate (PBT) resins and polyphenylene sulfide (PPS) resins, and a method of bonding the adhesive compositions to metal and plastic substrates.

BACKGROUND ART

It is known from Japanese Patent No. 2,990,646 or JP-A 8-199070 that a composition comprising a linear fluoropolyether compound having at least two alkenyl groups per molecule and a perfluoropolyether structure in its main chain, a fluorinated organohydrogensiloxane having at least two silicon-bonded hydrogen atoms (i.e., SiH groups) per molecule, and a platinum group compound cures into a product having a good profile of heat resistance, chemical resistance, solvent resistance, mold release, water repellency, oil repellency, and low-temperature properties.

It is also described that the composition is endowed with self adhesion to metal and plastic substrates by adding thereto an organopolysiloxane having a hydrosilyl group and an epoxy and/or trialkoxysilyl group as a third component. This adhesive composition can be cured by heat, and the cured composition is improved in the properties listed above. The composition is thus used for the bonding purpose in various industrial fields where these properties are required, for example, around electric and electronic components and automobile components (see Japanese Patent No. 3,239,717 or JP-A 9-95615).

However, the adhesive composition must be heat treated at high temperatures between 100° C. and 200°C. before the adhesive composition can be cured to metal or plastic substrates to establish a bond strength therebetween. If the substrates are thermoplastic resins which are less heat resistant, they can be deformed or altered by the heat. Such high temperatures are disadvantageous from the standpoints of energy saving and cost reduction. When the substrate is too large sized to place in a heating furnace, the use of the adhesive composition is restricted.

DISCLOSURE OF THE INVENTION

An object of the invention is to provide a heat-curable fluoropolyether adhesive composition which can be cured by heat treatment below 100° C. and are fully adherent to metal and plastic substrates, and a method of bonding the adhesive composition to metal and plastic substrates.

The inventors have found that a heat-curable fluoropolyether adhesive composition comprising (A) a linear polyfluoro compound having at least two alkenyl groups per molecule and a perfluoropolyether structure in its main chain, (B) a fluorinated organohydrogensiloxane having at least two SiH groups per molecule, (C) a platinum group metal-based catalyst, (D) an organosiloxane having at least one silicon-bonded hydrogen atom and at least one epoxy and/or trialkoxysilyl group per molecule, and (E) a compound having at least two allyloxycarbonyl groups per molecule can be readily cured by heating below 100° C. and the cured composition is tenaciously adherent to metal and plastic substrates.

In one aspect, the invention provides a heat-curable fluoropolyether adhesive composition comprising (A) 100 parts by weight of a linear polyfluoro compound having at least two alkenyl groups per molecule and a perfluoropolyether structure in its main chain, (B) a fluorinated organohydrogensiloxane having at least two silicon-bonded hydrogen atoms (i.e., SiH groups) per molecule, in an amount to provide 0.5 to 3.0 moles of SiH groups per mole of alkenyl groups on component (A), (C) a platinum group metal-based catalyst in an amount to provide 0.1 to 500 ppm of platinum group metal, (D) 0.1 to 10 parts by weight of an organosiloxane having per molecule at least one silicon-bonded hydrogen atom and at least one group selected from among epoxy groups and trialkoxysilyl groups which is bonded to a silicon atom through a carbon atom or through carbon and oxygen atoms, and (E) 0.01 to 5 parts by weight of a compound having at least two allyloxycarbonyl ($CH_2=CHCH_2OC(=O)-$) groups per molecule.

The adhesive composition may further comprise (F) 0.01 to 5 parts by weight of an organosilicon compound having at least one epoxy group and at least one silicon-bonded alkoxy group per molecule.

In one preferred embodiment, component (A) is a linear polyfluoro compound of the general formula (1):

$$CH_2=CH-(X)_a-Rf^2-(X')_a-CH=CH_2 \quad (1)$$

wherein X is $-CH_2-$, $-CH_2O-$, $-CH_2OCH_2-$ or $-Y-NR^1-CO-$, wherein Y is $-CH_2-$ or an o-, m- or p-dimethylsilylphenylene group of the structural formula (2):

and $R^1$ is hydrogen or a substituted or unsubstituted monovalent hydrocarbon group; X' is $-CH_2-$, $-OCH_2-$, $-CH_2OCH_2-$ or $-CO-NR^1-Y'-$, wherein Y' is $-CH_2-$ or an o-, m- or p-dimethylsilylphenylene group of the structural formula (3):

and $R^1$ is as defined above; "a" is independently 0 or 1; and $Rf^2$ is a divalent perfluoropolyether group of the general formula (4) or (5):

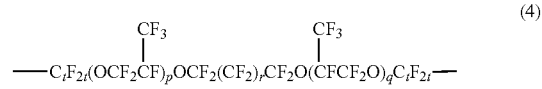

$$-C_tF_{2t}(OCF_2CF)_pOCF_2(CF_2)_rCF_2O(CFCF_2O)_qC_tF_{2t}- \quad (4)$$

wherein p and q each are an integer from 1 to 150, the average of sum p+q is from 2 to 200, r is an integer from 0 to 6 and t is 2 or 3,

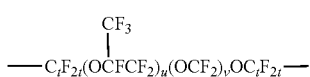
(5)

wherein u is an integer from 1 to 200, v is an integer from 1 to 50 and t is as defined above.

In another preferred embodiment, the linear polyfluoro compound (A) has an alkenyl content of 0.002 to 0.3 mol/100 g.

In a further preferred embodiment, the fluorinated organohydrogensiloxane (B) contains at least one monovalent perfluoroalkyl, monovalent perfluoroxyalkyl, divalent perfluoroalkylene or divalent perfluoroxyalkylene group per molecule.

In a further preferred embodiment, the organosiloxane (D) further contains at least one monovalent perfluoroalkyl or perfluoroxyalkyl group which is bonded to a silicon atom through a carbon atom or through carbon and oxygen atoms.

In a further preferred embodiment, component (E) is a compound having the general formula (6):

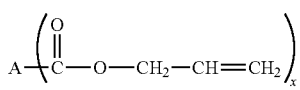
(6)

wherein A is a di- to tetra-valent group selected from among —CH═CH—, —CH$_2$CH$_2$—,

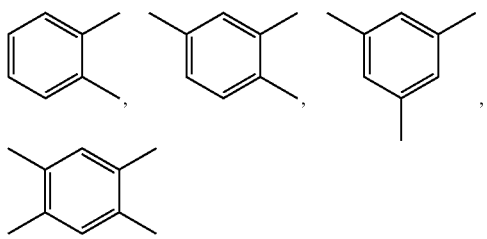

and x is equal to the valence of group A.

In another aspect, the invention provides a method of bonding an adhesive composition to a metal or plastic substrate, comprising heat curing the adhesive composition defined above on a metal or plastic substrate at a temperature below 100° C.

BENEFITS OF THE INVENTION

The fluoropolyether adhesive composition of the invention can be cured by heat treatment below 100° C. and are tenaciously adherent to metal and plastic substrates.

DESCRIPTION OF THE PREFERRED EMBODIMENT

In the specification, the terms "a" and "an" herein do not denote a limitation of quantity, but rather denote the presence of at least one of the referenced item. The abbreviation "Me" stands for methyl, "Ph" stands for phenyl, "pbw" is parts by weight, and "ppm" is parts by weight per million parts by weight.

Component A

Component (A) is a linear polyfluoro compound having at least two alkenyl groups per molecule, which preferably has the general formula (1).

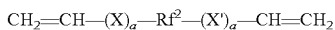
(1)

Herein, X is —CH$_2$—, —CH$_2$O—, —CH$_2$OCH$_2$— or —Y—NR$^1$—CO—, wherein Y is —CH$_2$— or an o-, m- or p-dimethylsilylphenylene group of the structural formula (2):

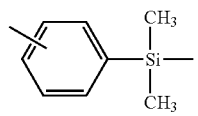
(2)

and R$^1$ is hydrogen or a substituted or unsubstituted monovalent hydrocarbon group. X' is —CH$_2$—, —OCH$_2$—, —CH$_2$OCH$_2$— or —CO—NR$^1$—Y'—, wherein Y' is —CH$_2$— or an o-, m- or p-dimethylsilylphenylene group of the structural formula (3):

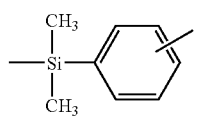
(3)

and R$^1$ is as defined above. Rf$^2$ is a divalent perfluoropolyether group. The subscript "a" is each independently 0 or 1.

R$^1$ is a hydrogen atom or a monovalent hydrocarbon group, preferably of 1 to 12 carbon atoms, and more preferably 1 to 10 carbon atoms. Exemplary hydrocarbon groups include alkyl groups such as methyl, ethyl, propyl, butyl, hexyl, cyclohexyl and octyl; aryl groups such as phenyl and tolyl; aralkyl groups such as benzyl and phenylethyl; and substituted forms of the foregoing monovalent hydrocarbon groups in which some or all hydrogen atoms are substituted by halogen atoms such as fluorine.

In formula (1), Rf$^2$ is a divalent perfluoropolyether structure, preferably a group having the general formula (4) or (5).

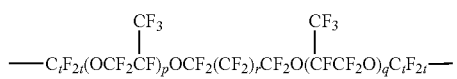
(4)

Herein p and q each are an integer from 1 to 150, the average of sum p+q is from 2 to 200, r is an integer from 0 to 6, and t is 2 or 3.

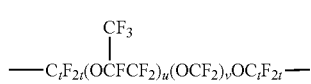
(5)

Herein u is an integer from 1 to 200, v is an integer from 1 to 50, and t is as defined above.

Preferred examples of the Rf$^2$ group include those of the following formulas (i) to (iii), with the divalent groups of formula (i) being more preferred.

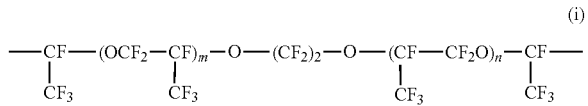
(i)

Herein m and n each are an integer of at least 1, and the average of sum m+n is from 2 to 200.

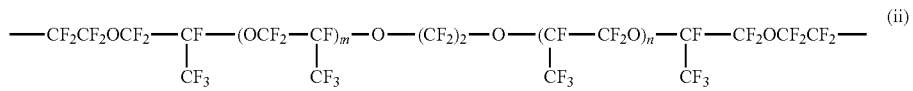

Herein m and n are each an integer of at least 1, and the average of sum m+n is from 2 to 200.

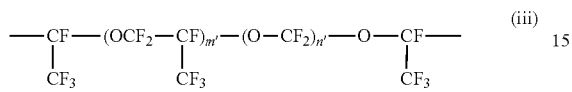

Herein m' is an integer from 1 to 200, and n' is an integer from 1 to 50.

Preferred as component (A) are compounds of the general formula (7).

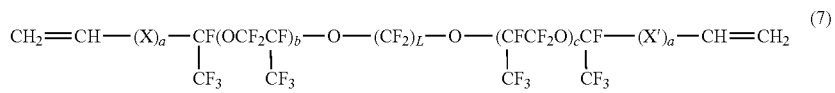

Herein, X is —CH$_2$—, —CH$_2$O—, —CH$_2$OCH$_2$— or —Y—NR$^1$—CO—, wherein Y is —CH$_2$— or an o-, m- or p-dimethylsilylphenylene group of the structural formula (2):

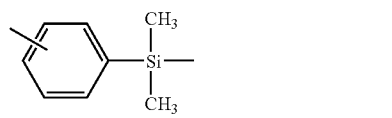

and R$^1$ is hydrogen, methyl, phenyl or allyl; X' is —CH$_2$—, —OCH$_2$—, —CH$_2$OCH$_2$— or —CO—NR$^1$—Y'—, wherein Y' is —CH$_2$— or an o-, m- or p-dimethylsilylphenylene group of the structural formula (3):

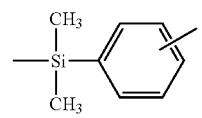

and R$^1$ is as defined above; the subscript "a" is each independently 0 or 1, L is an integer from 2 to 6, and "b" and "c" each are an integer from 0 to 200.

Examples of linear polyfluoro compounds of formula (7) include the compounds having the following formulas.

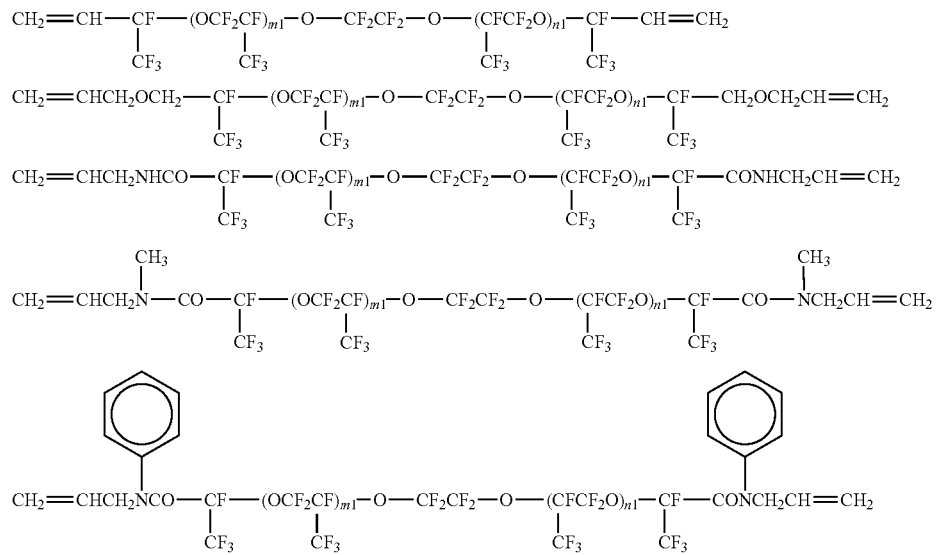

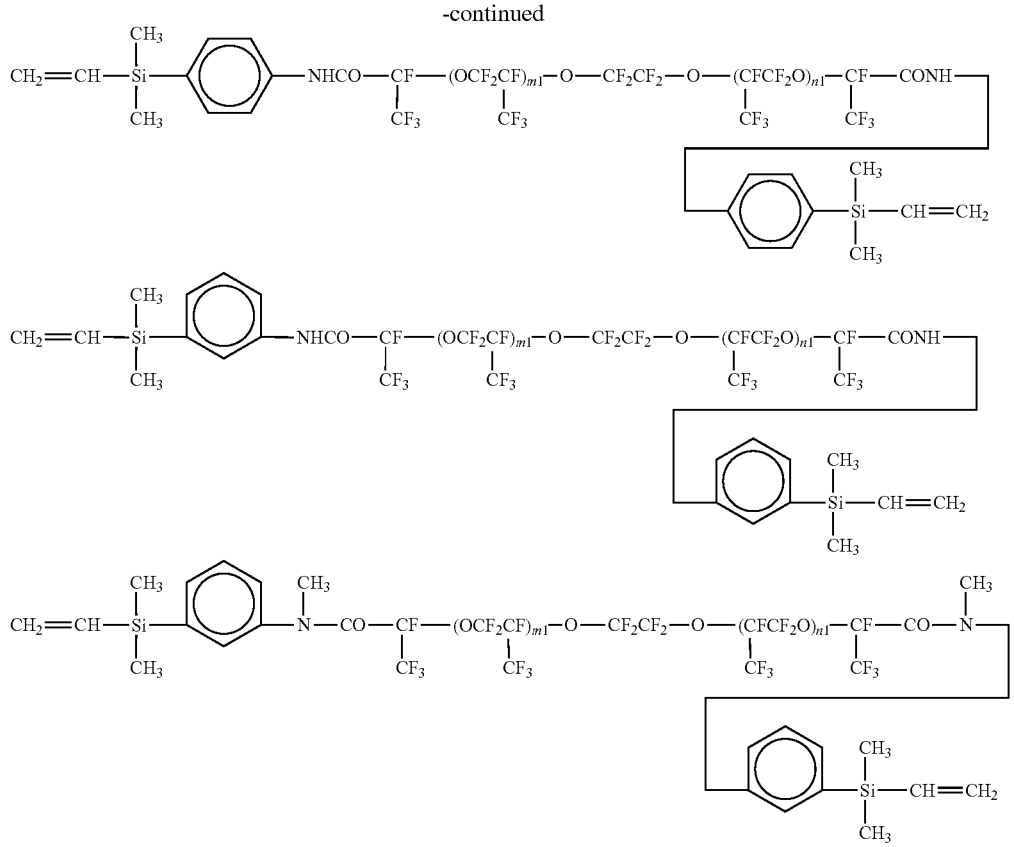

In the above formulas, m1 and n1 are each integers from 0 to 200, and the sum m1+n1 is from 6 to 200.

It is desirable that the linear polyfluoro compound of formula (7) have a viscosity at 23° C. in a range of 100 to 100,000 mPa·s, preferably 500 to 50,000 mPa·s, and even more preferably 1,000 to 20,000 mpa-s, as measured according to JIS K-6249 because the composition comprising the same can have appropriate physical properties when used for such purposes as sealing, potting, coating and impregnation, and also in the cured form. The most suitable viscosity for the intended application can be selected from within this viscosity range.

These linear polyfluoro compounds may be used alone or in a combination of two or more thereof.

Component B

Component (B) is a fluorinated organohydrogensiloxane having at least two, preferably at least three silicon-bonded hydrogen atoms per molecule. The silicon-bonded hydrogen atom is sometimes referred to as hydrosilyl or SiH group. In the composition, component (B) functions as a crosslinking agent or chain extender for component (A). For compatibility with and dispersibility in component (A), and uniformity after curing, it is preferable for component (B) to have on the molecule at least one fluorinated group selected from among monovalent perfluoroalkyl groups, monovalent perfluoroxyalkyl groups, divalent perfluoroalkylene groups and divalent perfluoroxyalkylene groups.

Suitable fluorinated groups include those of the following general formulas:

$C_gF_{2g+1}$—,

—$C_gF_{2g}$—, wherein g is an integer from 1 to 20, and preferably from 2 to 10,

$$F(\overset{CF_3}{\underset{|}{C}FCF_2O})_fC_hF_{2h}—$$

wherein f is an integer from 2 to 200, and preferably from 2 to 100, and h is an integer from 1 to 3,

$$—\overset{CF_3}{\underset{|}{C}F}(OCF_2\overset{CF_3}{\underset{|}{C}F})_iOCF_2CF_2O(\overset{CF_3}{\underset{|}{C}FCF_2O})_j\overset{CF_3}{\underset{|}{C}F}—$$

wherein i and j are each an integer of at least 1, the average of sum i+j is from 2 to 200, and preferably from 2 to 100, and

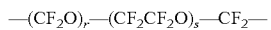
—(CF$_2$O)$_r$—(CF$_2$CF$_2$O)$_s$—CF$_2$— wherein r and s are each an integer from 1 to 50.

Divalent linkages for linking the above perfluoroalkyl, perfluoroxyalkyl, perfluoroalkylene or perfluoroxyalkylene groups with silicon atoms include alkylene groups, arylene groups and combinations thereof, which may be separated by an ether-bonding oxygen atom, amide bond, carbonyl bond or the like. Specific examples include those having 2 to 12 carbons, such as —CH$_2$CH$_2$—, —CH$_2$CH$_2$CH$_2$—, —CH$_2$CH$_2$CH$_2$OCH$_2$—, —CH$_2$CH$_2$CH$_2$—NH—CO—, —CH$_2$CH$_2$CH$_2$—N(Ph)—CO—, —CH$_2$CH$_2$CH$_2$—N(CH$_3$)—CO—, and —CH$_2$CH$_2$CH$_2$—O—CO—.

In addition to the monovalent or divalent fluorinated substituent group, i.e., organic group having a perfluoroalkyl, perfluoroxyalkyl, perfluoroalkylene or perfluoroxyalkylene group, the fluorinated organohydrogenpolysiloxane (B) may contain another monovalent substituent group bonded to a silicon atom. Suitable other substituent groups are substituted or unsubstituted hydrocarbon groups of 1 to 20 carbon atoms including alkyl groups such as methyl, ethyl, propyl, butyl, hexyl, cyclohexyl, octyl, and decyl, alkenyl groups such as vinyl and allyl, aryl groups such as phenyl, tolyl and naphthyl, aralkyl groups such as benzyl and phenylethyl, and substituted forms of the foregoing in which at least some hydrogen atoms are substituted by chlorine atoms, cyano groups or the like, such as chloromethyl, chloropropyl, and cyanoethyl.

The fluorinated organohydrogenpolysiloxane (B) may be cyclic, chain-like, three-dimensional network or combinations thereof. Although the number of silicon atoms in the fluorinated organohydrogenpolysiloxane is not particularly limited, it is generally from 2 to about 60, preferably from 3 to about 30.

Illustrative examples of component (B) having such fluorinated groups include the following compounds. These compounds may be used singly or as combinations of two or more thereof.

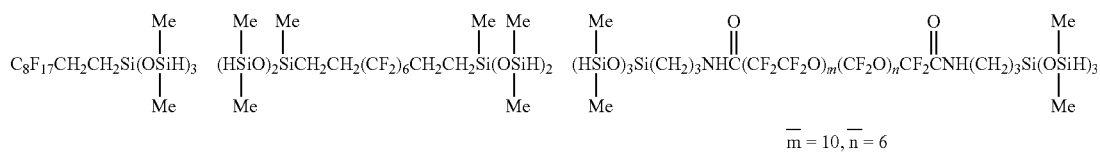

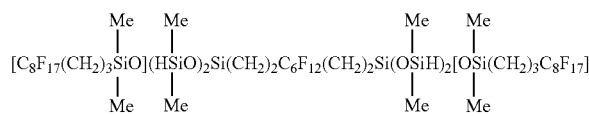

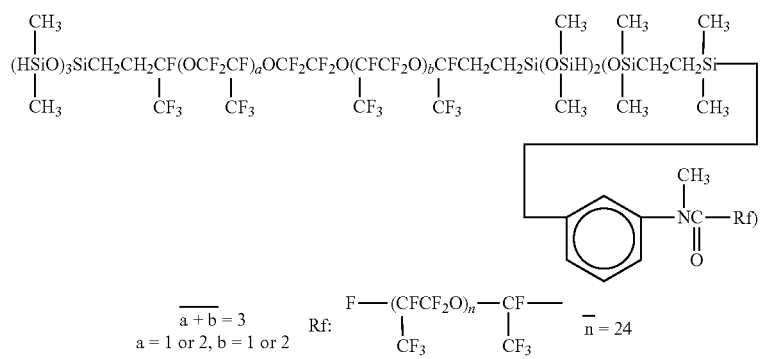

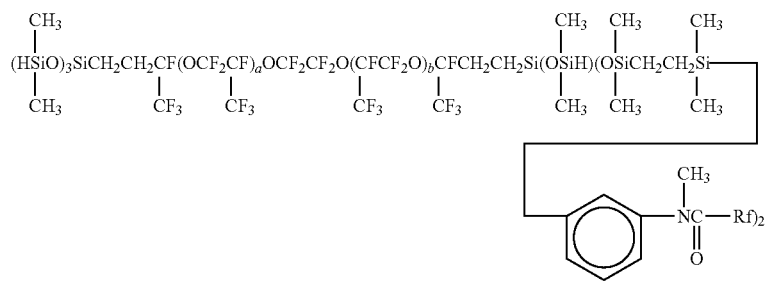

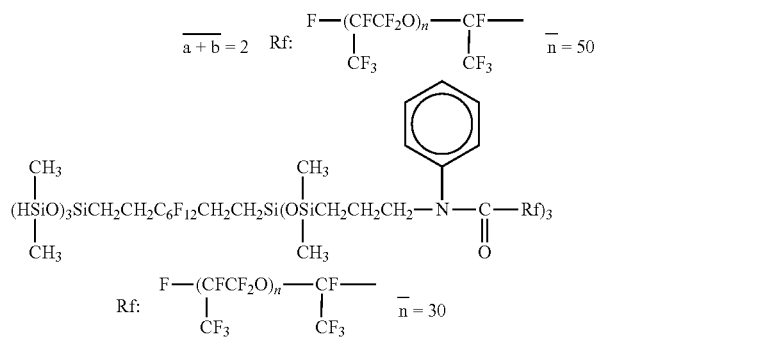

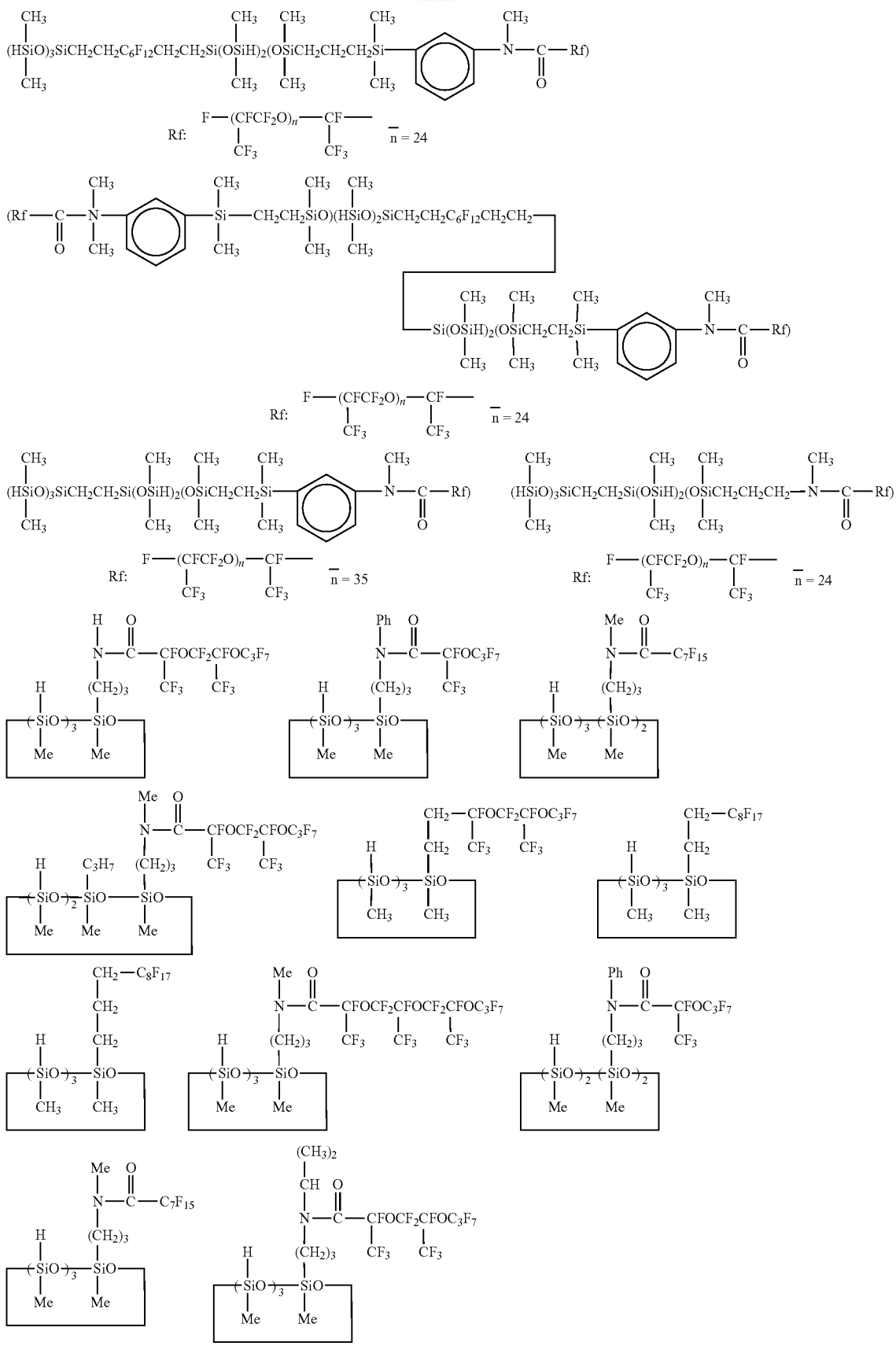

-continued
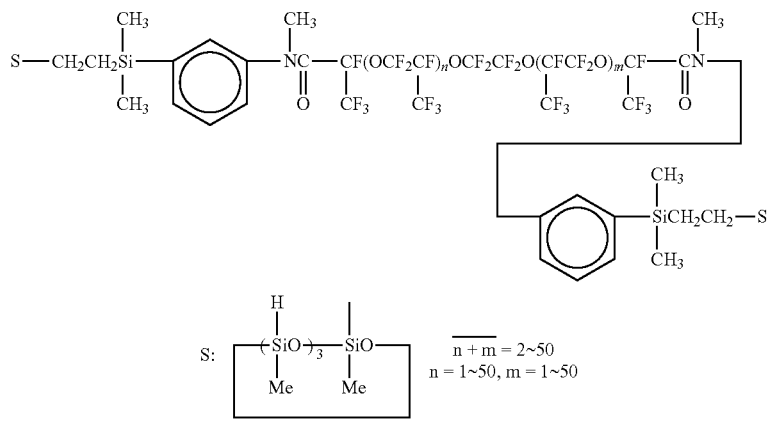
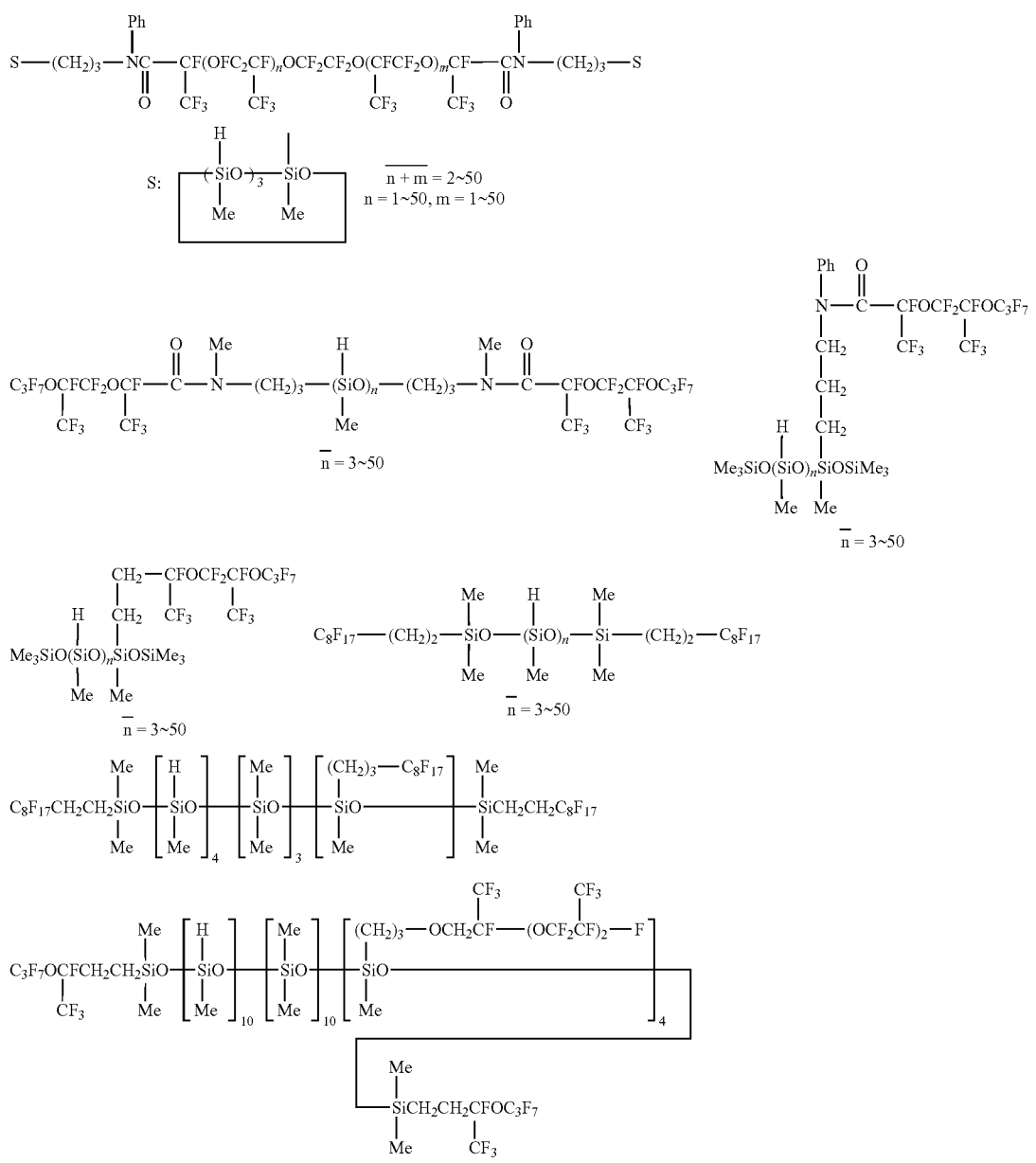

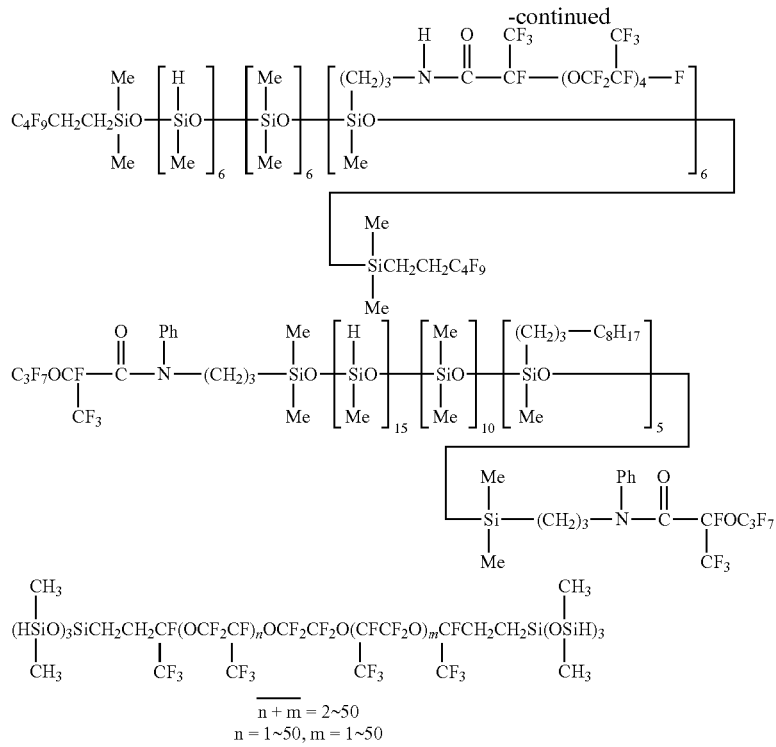

$$\overline{n+m} = 2\sim50$$
$$n = 1\sim50, m = 1\sim50$$

Component (B) is included in an amount effective for curing component (A), and specifically a sufficient amount to provide 0.5 to 3.0 moles, and preferably 0.8 to 2.0 moles of hydrosilyl (SiH) groups per mole of alkenyl groups (e.g., vinyl, allyl, cycloalkenyl groups) on component (A). Too few hydrosilyl groups may lead to an insufficient degree of crosslinking, failing to obtain a properly cured product. Too many hydrosilyl groups may result in foaming during the curing process.

Component C

Component (C) is a platinum group metal based catalyst which is a hydrosilylation reaction catalyst. The hydrosilylation catalyst promotes addition reactions between alkenyl groups in component (A) and hydrosilyl groups in component (B). The hydrosilylation catalysts are generally noble metals or compounds thereof, and thus expensive. Of these, platinum or platinum compounds are often used because they are readily available.

Exemplary platinum compounds include chloroplatinic acid and complexes of chloroplatinic acid with olefins (e.g., ethylene), alcohols and vinyl siloxanes, and metallic platinum on supports such as silica, alumina and carbon. Known platinum group metal catalysts other than platinum compounds include rhodium, ruthenium, iridium and palladium compounds, for example, $RhCl(PPh_3)_3$, $RhCl(CO)(PPh_3)_2$, $Ru_3(CO)_{12}$, $IrCl(CO)(PPh_3)_2$ and $Pd(PPh_3)_4$.

If these catalysts are solid catalysts, they may be used in a solid state. A more uniform cured product may be obtained by previously dissolving chloroplatinic acid or a complex thereof in a suitable solvent so that the resulting solution is compatible with the linear polyfluoro compound (A).

Component (C) may be used in a catalytic amount. The amount of catalyst used may be determined as appropriate depending on the desired cure rate. In general, the catalyst is used in an amount to provide 0.1 to 500 ppm of platinum group metal based on the weight of component (A).

Component D

Component (D) is an organosiloxane which bears on each molecule at least one silicon-bonded hydrogen atom and at least one group selected from among epoxy and trialkoxysilyl groups which is bonded to a silicon atom through an intervening carbon atom or through intervening carbon and oxygen atoms. It is a tackifier for conferring the composition with sufficient self-adhesiveness. For compatibility with and dispersibility in component (A), and uniformity after curing, it is preferred that the organosiloxane have also at least one monovalent perfluoroalkyl group or monovalent perfluoroxyalkyl group bonded to a silicon atom through an intervening carbon atom or through intervening carbon and oxygen atoms.

The organosiloxane (D) has a siloxane skeleton which may be, for example, cyclic, linear or branched, or a combination thereof. Suitable organosiloxanes used herein include those having the following general formulas.

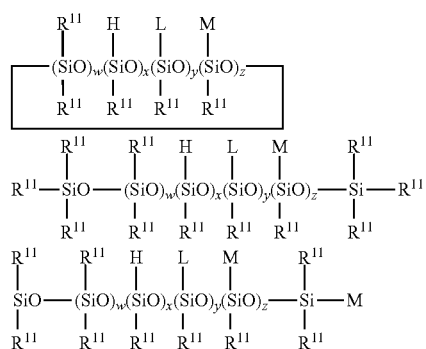

In these formulas, $R^{11}$ is a halogen-substituted or unsubstituted monovalent hydrocarbon group; L and M are as described below; the subscript w is an integer from 0 to 50, and preferably from 0 to 20; x is an integer from 1 to 50, and preferably from 1 to 20; y is an integer from 1 to 50, and preferably from 1 to 20; and z is an integer from 0 to 50, and preferably from 0 to 20. The sum w+x+y+z is such an integer that the organosiloxane may have a weight average molecular weight of 2,000 to 20,000, as measured by GPC versus polystyrene standards.

$R^{11}$ is a halogen-substituted or unsubstituted monovalent hydrocarbon group of 1 to 10 carbon atoms, and preferably 1 to 8 carbon atoms. Examples include alkyl groups such as methyl, ethyl, propyl, butyl, hexyl, cyclohexyl and octyl; aryl groups such as phenyl and tolyl; aralkyl groups such as benzyl and phenylethyl; and substituted forms of the foregoing monovalent hydrocarbon groups in which some or all hydrogen atoms are substituted by fluorine or other halogen atoms. Of these, methyl is most preferred.

In the above formulas, L represents an epoxy group and/or trialkoxysilyl group which is bonded to a silicon atom through an intervening carbon atom or through intervening carbon and oxygen atoms. Specific examples include groups of the following formulas.

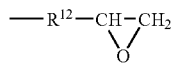

Herein $R^{12}$ is a divalent hydrocarbon group with 1 to 10 carbon atoms, and preferably 1 to 5 carbon atoms, which may be separated by an oxygen atom, typically an alkylene group such as methylene, ethylene, propylene, butylene, hexylene, cyclohexylene or octylene.

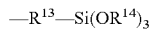

Herein $R^{13}$ is a divalent hydrocarbon group with 1 to 10 carbon atoms, and preferably 1 to 4 carbon atoms, typically an alkylene group such as methylene, ethylene, propylene, butylene, hexylene, cyclohexylene or octylene. $R^{14}$ is a monovalent hydrocarbon group with 1 to 8 carbon atoms, and preferably 1 to 4 carbon atoms, typically an alkyl group such as methyl, ethyl or n-propyl.

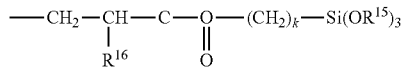

Herein $R^{15}$ is a monovalent hydrocarbon group (e.g., alkyl group) with 1 to 8 carbon atoms, and preferably 1 to 4 carbon atoms, $R^{16}$ is hydrogen or methyl, and k is an integer from 2 to 10.

In the above formulas, M represents a structure of the general formula (8):

$$—Z—Rf \qquad (8)$$

wherein Z is preferably —(CH$_2$)$_t$—X"— wherein X" is a group of the formula: —OCH$_2$— or —Y"—NR'—CO— wherein Y" is —CH$_2$— or an o-, m- or p-dimethylsilylphenylene group of the structural formula (9):

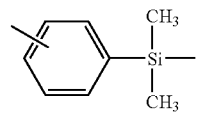

and R' is hydrogen or a substituted or unsubstituted monovalent hydrocarbon group of 1 to 12 carbon atoms, and more preferably 1 to 10 carbon atoms, t is an integer from 1 to 10, and preferably from 1 to 5, and Rf is a monovalent perfluoroalkyl or perfluoroxyalkyl group.

Examples of the monovalent perfluoroalkyl or perfluoroxyalkyl group represented by Rf are as exemplified for the monovalent fluorinated groups in component (B). Exemplary groups include those of the following general formulas.

Herein g is an integer from 1 to 20, and preferably from 2 to 10, f is an integer from 2 to 200, and preferably from 2 to 100, and h is an integer from 1 to 3.

These organosiloxanes can be prepared through partial addition reaction of an organohydrogenpolysiloxane bearing at least three silicon-bonded hydrogen atoms (SiH groups) per molecule with a compound bearing an aliphatic unsaturated group (e.g., vinyl or allyl) and an epoxy and/or trialkoxysilyl group and optionally, a compound having an aliphatic unsaturated group and a perfluoroalkyl or perfluoroxyalkyl group by a standard technique. The number of aliphatic unsaturated groups must be smaller than the number of SiH groups.

When the organosiloxane is prepared in this way, the target substance may be isolated following reaction completion. It is also possible to use as component (D) the reaction mixture from which only the unreacted reactants and the addition reaction catalyst have been removed.

Examples of the organosiloxanes which may be used as component (D) include those having the following structural formulas. These compounds may be used singly or as combinations of two or more thereof.

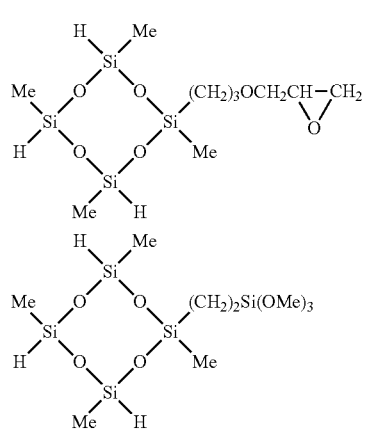

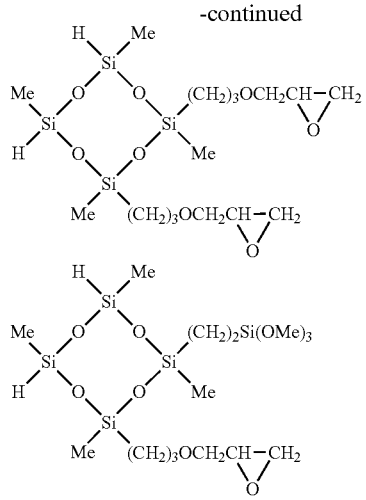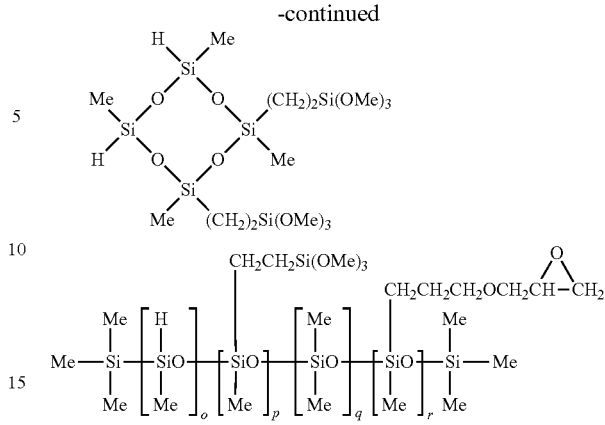
The letters o, q and r represent positive integers, and p is 0 or a positive integer.
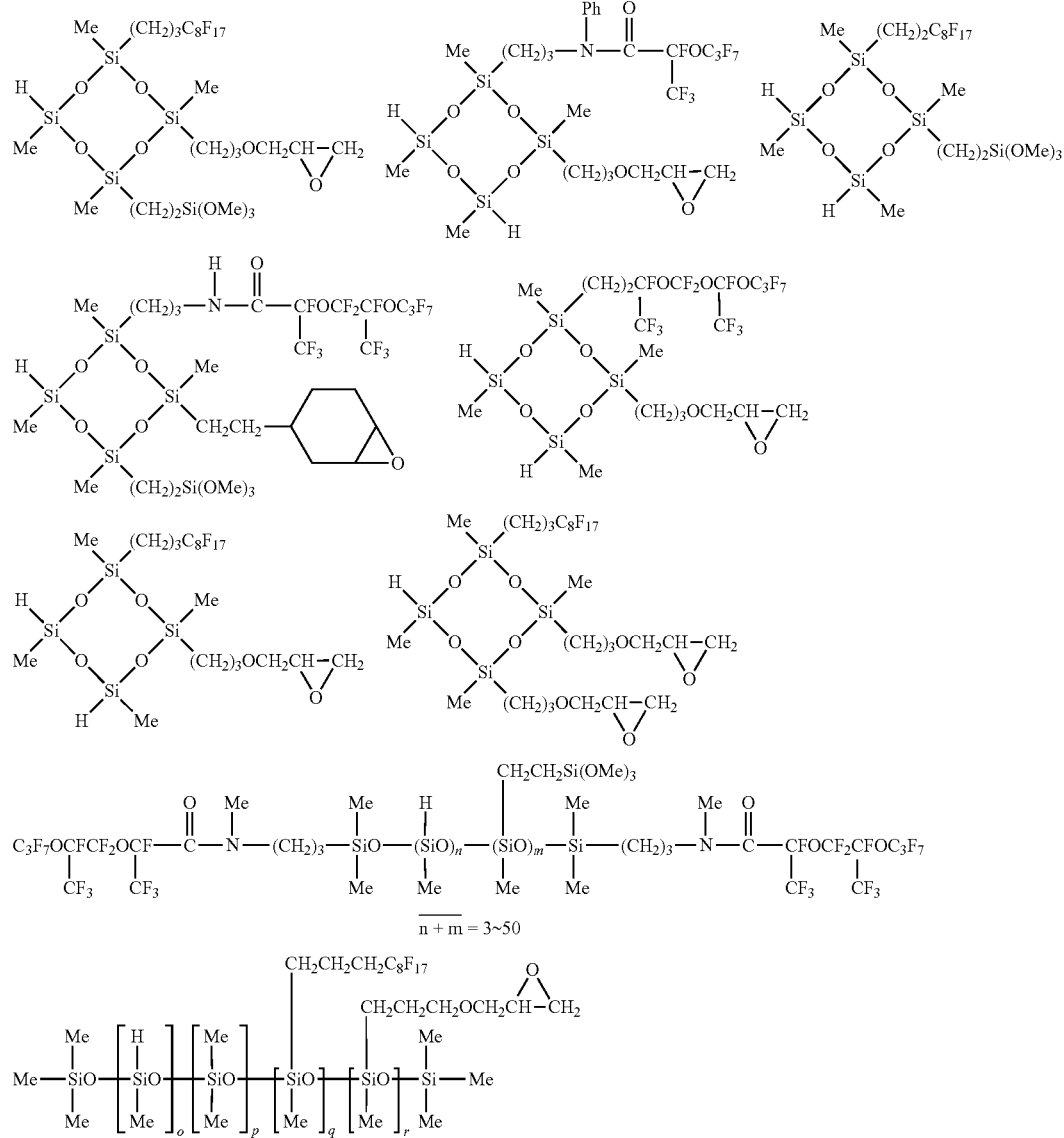

The letters o, q and r represent positive integers, and p is 0 or a positive integer.

Component (D) is included in an amount of 0.1 to 10 parts by weight, and preferably 0.5 to 5 parts by weight, per 100 parts by weight of component (A). Less than 0.1 pbw of component (D) cannot achieve sufficient adhesion. Inclusion of more than 10 pbw of component (D) may interfere with the flow and cure of the composition and adversely affect the physical strength of the cured composition.

Component E

Component (E) is a compound having at least two allyloxy-carbonyl ($CH_2$=$CHCH_2OC$(=O)—) groups per molecule. It is effective for improving the adhesion of the composition to metal or plastic substrates when cured by heat treatment below 100° C.

Those compounds of the general formula (6) are preferred as component (E).

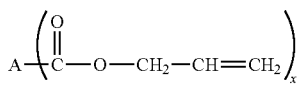  (6)

Herein A is a di-, tri- or tetra-valent group selected from among —CH=CH—, —$CH_2CH_2$—,

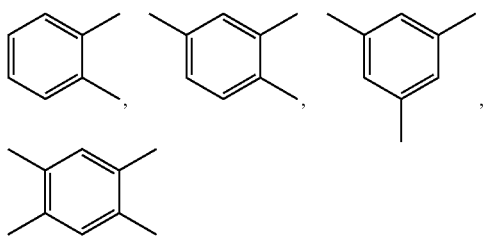

and x is equal to the valence of group A.

Preferred examples of the compound having formula (6) include those of the following structural formulas.

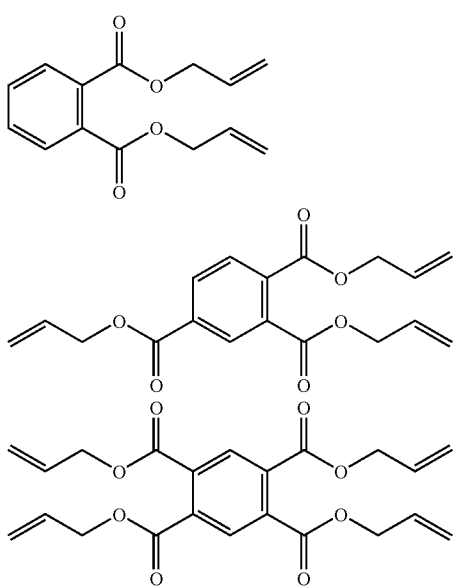

Component (E) is included in an amount of 0.01 to 5 parts by weight, and preferably 0.1 to 3 parts by weight per 100 parts by weight of component (A). Less than 0.01 pbw of component (E) cannot achieve sufficient adhesion. With more than 5 pbw of component (E), the composition may have a poor flow and lose shelf stability with the lapse of time, and the resulting cured product may have a diminished physical strength.

Component F

In the heat-curable fluoropolyether adhesive composition, various additives may be added to enhance its viable utility if necessary. Among others, it is preferred to add (F) an organosilicon compound having at least one epoxy group and at least one silicon-bonded alkoxy group per molecule as a tackifier.

Examples of the organosilicon compound (F) include those compounds of the following formulas.

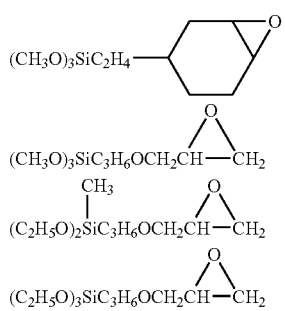

Component (F) is preferably included in an amount of 0.01 to 5 parts by weight, and more preferably 0.1 to 3 parts by weight per 100 parts by weight of component (A). Less than 0.01 pbw of component (F) may not achieve sufficient adhesion. Inclusion of more than 5 pbw of component (F) may adversely affect the flow of the composition and the physical strength of the cured composition.

Other Components

In addition to above components (A) to (E) and optional component (F), optional ingredients may be included in the inventive composition to increase its viable utility, for example, plasticizers, viscosity modifiers, flexibilizers, inorganic fillers, and adhesion promoters. These additives may be included in any desired amounts insofar as they do not compromise the objects of the invention or adversely affect the properties of the composition in both the uncured and cured states.

Polyfluoromonoalkenyl compounds of the general formula (10) below and/or linear polyfluoro compounds of the general formulas (11) and (12) below may be used as the plasticizer, viscosity modifier or flexibilizer.

  (10)

In formula (10), X' and "a" are as defined in formula (1), and $Rf^3$ is a group having the general formula (13):

  (13)

wherein t is 2 or 3, and w is a positive integer which is at least 1, but smaller than the sum of p+q (average) plus r and smaller than the sum u+v for the $Rf^2$ group in above component (A).

$$D-O-(CF_2CF_2CF_2O)_c-D \quad (11)$$

In formula (11), D is a group of the formula $C_sF_{2s+1}$—, s being 1 to 3, and c is an integer which is from 1 to 200, but smaller than the sum of p+q (average) plus r and smaller than the sum u+v for the Rf2 group in above component (A).

$$D-O-(CF_2O)_d(CF_2CF_2O)_e-D \quad (12)$$

In formula (12), D is as defined above, and d and e are each integers of 1 to 200 such that the sum d+e is no larger than the sum of p+q (average) plus r and no larger than the sum u+v for the $Rf^2$ group in above component (A).

Examples of polyfluoromonoalkenyl compounds of formula (10) include the following, wherein m2 satisfies the above requirement.

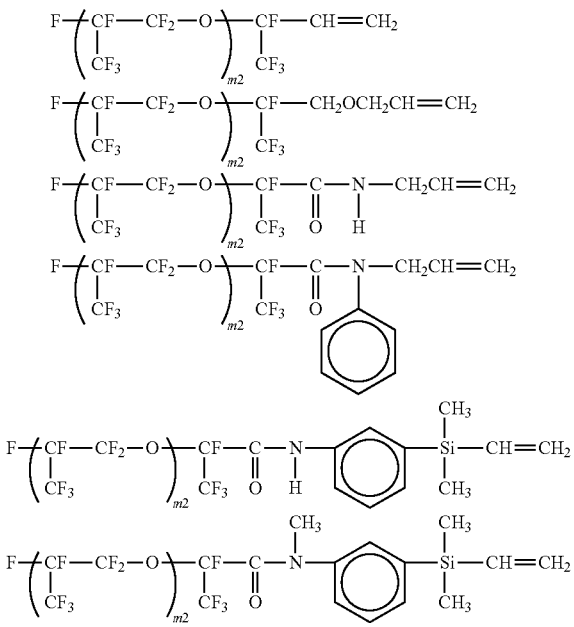

Examples of linear polyfluoro compounds of formulas (11) and (12) include the following, wherein n3 and the sum n3+m3 satisfy the above requirements.

$$CF_3O-(CF_2CF_2CF_2O)_{n3}-CF_2CF_3$$

$$CF_3-[(OCF_2CF_2)_{n3}(OCF_2)_{m3}]-O-CF_3$$

In these formulas, m3 and n3 are each from 1 to 200, and the sum m3+n3 is from 2 to 201.

Polyfluoro compounds of formulas (10) to (12) may be included in the inventive composition in an amount of 1 to 300 parts by weight, and preferably 50 to 250 parts by weight, per 100 parts by weight of the polyfluorodialkenyl compound of formula (1) or component (A). Like the polyfluorodialkenyl compound, these polyfluoro compounds of formulas (10) to (12) desirably have a viscosity at 23° C. within a range of 5 to 100,000 mPa·s.

Exemplary inorganic fillers include reinforcing or semi-reinforcing fillers such as fumed silica, colloidal silica, quartz powder, fused silica powder, diatomaceous earth and calcium carbonate (typically in amounts of 0.1 to 50 pbw, and preferably 1 to 25 pbw per 100 pbw of component (A)); inorganic pigments such as titanium oxide, iron oxide, carbon black and cobalt aluminate; heat stabilizers such as titanium oxide, iron oxide, carbon black, cerium oxide, cerium hydroxide, zinc carbonate, magnesium carbonate and manganese carbonate; and thermal conductive agents such as alumina, boron nitride, silicon carbide and metal powders.

Suitable hydrosilylation catalyst regulators include acetylenic alcohols such as 1-ethynyl-1-hydroxycyclohexane, 3-methyl-1-butyn-3-ol, 3,5-dimethyl-1-hexyn-3-ol, 3-methyl-1-penten-3-ol and phenylbutynol; the reaction products of chlorosilanes having a monovalent fluorinated substituent with the foregoing acetylenic alcohols; 3-methyl-3-penten-1-yne, 3,5-dimethyl-3-hexen-1-yne and triallyl isocyanurate; polyvinylsiloxane, and organophosphorus compounds. The addition of these compounds helps to maintain a curing reactivity and shelf stability appropriate.

Adhesion promoters such as carboxylic anhydrides and titanic acid esters may also be added to the composition.

The heat-curable fluoropolyether adhesive composition of the invention can be prepared by any desired technique. For example, the composition may be prepared by mixing together above components (A) to (E), (F) and optional other ingredients. For mixing, use may be made of mixing, kneading or milling apparatus such as a planetary mixer, Ross mixer, Hobart mixer, kneader and three-roll mill.

No particular limitation is imposed on the construction of the adhesive composition. Depending on a particular application, the composition may be of one package type, that is, formulated as a single composition containing components (A) to (E), (F) and optional other ingredients altogether. Alternatively, the composition may be formulated as two packages which are mixed at the time of use.

The heat-curable fluoropolyether adhesive composition may be cured at a temperature from 20° C. to less than 100° C., preferably from 50° C. to less than 100° C., and more preferably from 70° C. to less than 100° C. A suitable curing time may be selected such that the crosslinking reaction and substrate binding reaction are complete although the curing time is preferably from 30 minutes to 6 hours, more preferably 1 to 6 hours, and even more preferably 2 to 6 hours.

The adhesive composition thus obtained can be heat cured at a temperature below 100° C. to metal and plastic substrates. Specifically, the cured composition provides strong adhesion to aluminum, polybutylene terephthalate (PBT) resins, and polyphenylene sulfide (PPS) resins. Then the composition is best suited as the adhesive applied around electric and electronic components and around automobile components.

On use of the adhesive composition, the composition may be dissolved in a suitable fluorochemical solvent to an appropriate concentration, depending on a particular application and purpose of use. Suitable solvents include 1,3-bis(trifluoromethyl)benzene, Fluorinert® (available from 3M Corporation), perfluorobutyl methyl ether and perfluorobutyl ethyl ether. The use of a solvent is especially preferred in thin-film coating applications.

When cured products of the heat-curable fluoropolyether adhesive compositions are bonded to various substrates, various primers may be used in combination.

EXAMPLE

Examples of the invention are given below by way of illustration and not by way of limitation. All parts are by weight. The viscosity is measured at 23° C. in accordance with JIS K-6249.

Example 1

The ingredients used herein were: 100 parts of a polymer of formula (14) (viscosity 10,000 mpa·s, vinyl content 0.012 mol/100 g), 5.0 parts of fumed silica R-976 which had been surface treated to be hydrophobic (Nippon Aerosil Co., Ltd., BET specific surface area 250 m²/g), 0.99 part of a fluorinated organohydrogensiloxane of formula (15) (SiH content 0.0085 mol/g), 1.24 parts of a fluorinated organohydrogensiloxane of formula (16) (SiH content 0.0039 mol/g), 0.35 part of a toluene solution of platinum-divinyltetramethyldisiloxane complex (platinum concentration 0.5 wt %), 2.0 pars of a fluorinated organohydrogensiloxane of formula (17), 0.25 part of a compound of formula (18) (TRIAM-805 by Wako Pure Chemical Industries, Ltd.), 0.20 part of a compound of formula (19), and 0.100 part of a compound of formula (20). A composition was prepared by adding the ingredients in sequence to the polymer and mixing them until uniform, followed by deaeration.

Next, adhesion test specimens were prepared by sandwiching a 1 mm thick layer of the composition of Example 1 between 100×25 mm test panels of different adherends (aluminum, polybutylene terephthalate (PBT) resin, and polyphenylene sulfide (PPS) resin) arranged with an overlap between their respective edges of 10 mm, and heating at 80° C. for 3 hours to cure the composition. A tensile-shear strength test (pulling rate 50 mm/min) was carried out on these specimens for evaluating shear bond strength (MPa) and cohesive failure rate (area %). The results are shown in Table 1.

Example 2

A composition was prepared by the same procedure as in Example 1 aside from changing the amount of the compound of formula (20) to 0.175 part. Shear strength and cohesive failure were similarly tested, with the results shown in Table 1.

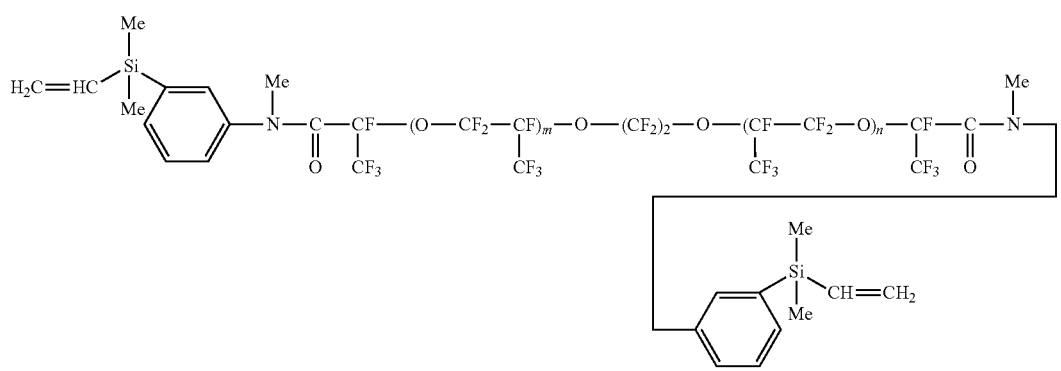

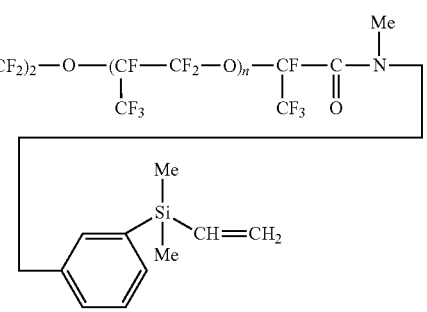

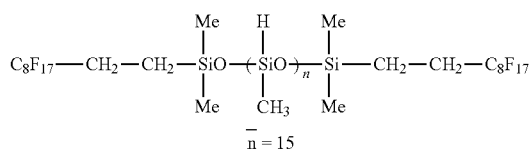

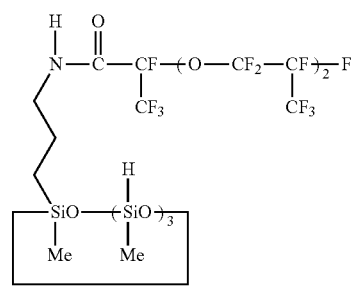

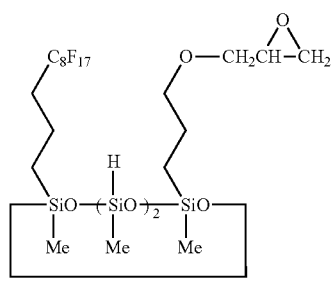

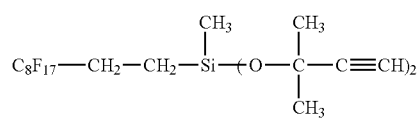

Comparative Example 1

A composition was prepared by the same procedure as in Example 1 aside from omitting the compound of formula (18). Shear strength and cohesive failure were similarly tested, with the results shown in Table 1.

Comparative Example 2

A composition was prepared by the same procedure as in Example 1 aside from omitting the compound of formula (18) from the formulation of Example 2. Shear strength and cohesive failure were similarly tested, with the results shown in Table 1.

TABLE 1

| Shear bond strength (MPa) | Example | | Comparative Example | |
|---|---|---|---|---|
| | 1 | 2 | 1 | 2 |
| Adherend Al | 1.6 (100) | 1.8 (100) | 0.8 (10) | 1.0 (20) |
| PBT | 1.6 (100) | — | 0.4 (0) | — |
| PPS | — | 1.2 (100) | — | 0.3 (0) |

Values in parenthesis indicate cohesive failure rate in % by area.

Japanese Patent Application No. 2007-139131 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A heat-curable fluoropolyether adhesive composition, comprising:
(A) 100 parts by weight of a linear polyfluoro compound of formula (1) having at least two alkenyl groups per molecule and a perfluoropolyether structure in its main chain;

$$CH_2=CH-(X)_a-Rf^2-(X')_a-CH=CH_2 \quad (1)$$

wherein X is $-CH_2-$, $-CH_2O-$, $-CH_2OCH_2-$ or $-Y-NR^1-CO-$,
wherein Y is $-CH_2-$ or an o-, m- or p-dimethylsilylphenylene group of formula (2):

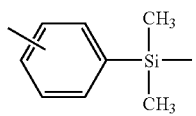

and $R^1$ is hydrogen or a substituted or unsubstituted monovalent hydrocarbon group,
X' is $-CH_2-$, $-OCH_2-$, $-CH_2OCH_2-$ or $-CO-NR^1-Y'-$, wherein Y' is $-CH_2-$ or an o-, m- or p-dimethylsilylphenylene group of the structural formula (3):

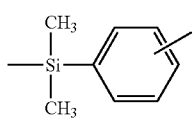

and $R^1$ is as defined above,

"a" is independently 0 or 1, and
$Rf^2$ is a divalent perfluoropolyether group of the general formula (4) or (5):

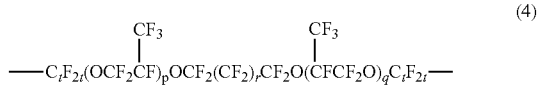

wherein p and q each are an integer from 1 to 150, the average of sum p+q is from 2 to 200, r is an integer from 0 to 6 and t is 2 or 3,

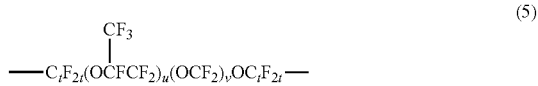

wherein u is an integer from 1 to 200, v is an integer from 1 to 50 and t is as defined above;
(B) a fluorinated organohydrogensiloxane having at least two silicon-bonded hydrogen atoms (i.e., SiH groups) per molecule, in an amount to provide 0.5 to 3.0 moles of SiH groups per mole of alkenyl groups on component (A);
(C) a platinum group metal-based catalyst in an amount to provide 0.1 to 500 ppm of platinum group metal;
(D) 0.1 to 10 parts by weight of an organosiloxane having per molecule at least one silicon-bonded hydrogen atom and at least one group selected from the group consisting of epoxy groups and trialkoxysilyl groups which is bonded to a silicon atom through a carbon atom or through carbon and oxygen atoms; and
(E) 0.1 to 3 parts by weight of a compound of formula (6) having at least two allyloxycarbonyl ($CH_2=CHCH_2OC(=O)-$) groups per molecule:

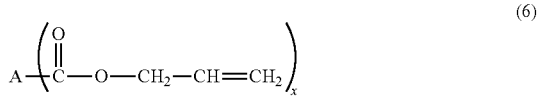

wherein A is a di- to tetra-valent group selected from the group of structures consisting of

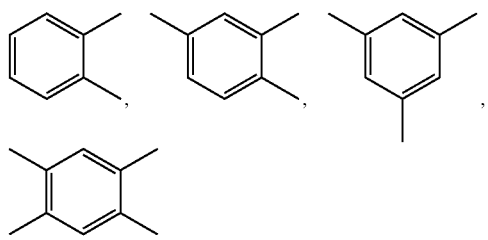

and x is equal to the valence of group A; and
(F) 0.01 to 5 parts by weight of an organosilicon compound having at least one epoxy group and at least one silicon-bonded alkoxy group per molecule.

2. The adhesive composition of claim 1 wherein the linear polyfluoro compound (A) has an alkenyl content of 0.002 to 0.3 mol/100 g.

3. The adhesive composition of claim 1 wherein the fluorinated organohydrogensiloxane (B) contains at least one group per molecule selected from the group consisting of a monovalent perfluoroalkyl group, a monovalent perfluoroxyalkyl group, a divalent perfluoroalkylene group and a divalent perfluoroxyalkylene group.

4. The adhesive composition of claim 1, wherein the organosiloxane (D) further contains at least one monovalent perfluoroalkyl or perfluoroxyalkyl group which is bonded to a silicon atom through a carbon atom or through carbon and oxygen atoms.

5. A method of bonding an adhesive composition to a metal or plastic substrate, comprising heat curing the adhesive composition of claim 1 on a metal or plastic substrate at a temperature below 100° C.

6. The adhesive composition of claim 1, wherein A of component (E) of formula (6) is the tetravalent benzene structure shown in the list of structures for A.

* * * * *